United States Patent [19]
Mitchell

[11] 3,885,615
[45] May 27, 1975

[54] PNEUMATIC TIRE WHEEL RIM ASSEMBLY

[75] Inventor: William Eric Mitchell, Coventry, England

[73] Assignee: Dunlop Limited, London, England

[22] Filed: June 7, 1972

[21] Appl. No.: 260,463

[30] Foreign Application Priority Data
June 16, 1971 United Kingdom............... 28096/71

[52] U.S. Cl. ............ 152/411; 152/381 A; 152/396; 152/399; 301/11 CD
[51] Int. Cl..... B60b 23/10; B60b 25/22; B60c 5/12
[58] Field of Search .......... 152/376, 379, 380, 381, 152/382, 383, 384, 385, 386, 391, 405, 406, 407, 408, 409, 410, 411, 412, 413, 414, 381 A, 396, 399; 301/11 CD

[56] References Cited
UNITED STATES PATENTS

| | | | |
|---|---|---|---|
| 1,939,935 | 12/1933 | Wagenhorst | 152/406 X |
| 2,198,978 | 4/1940 | Sauer | 152/381 |
| 3,019,056 | 1/1962 | Keilman | 301/63 DS |
| 3,229,744 | 1/1966 | Bradley | 152/381 |

FOREIGN PATENTS OR APPLICATIONS

| | | | |
|---|---|---|---|
| 799,839 | 8/1958 | United Kingdom | 152/381 |
| 348,883 | 10/1960 | Switzerland | 152/379 |

Primary Examiner—Lloyd L. King
Assistant Examiner—Howard Beltran
Attorney, Agent, or Firm—Stevens, Davis, Miller & Mosher

[57] ABSTRACT

A rim for a pneumatic tire comprising two rim parts, the first rim part consists of a tire bead retaining flange and bead seating portion and is secured to a second rim part which comprises the other tire bead retaining flange. The second rim part is formed in the region adjacent the first rim part with a circumferentially extending radially outwardly projecting hump portion which is arranged to be capable of making airtight sealing engagement with the bead of an associated tire seated on the first rim part. The second rim part also comprises a shallow well portion of sufficient depth to enable a tire bead to be passed over the hump portion.

12 Claims, 4 Drawing Figures

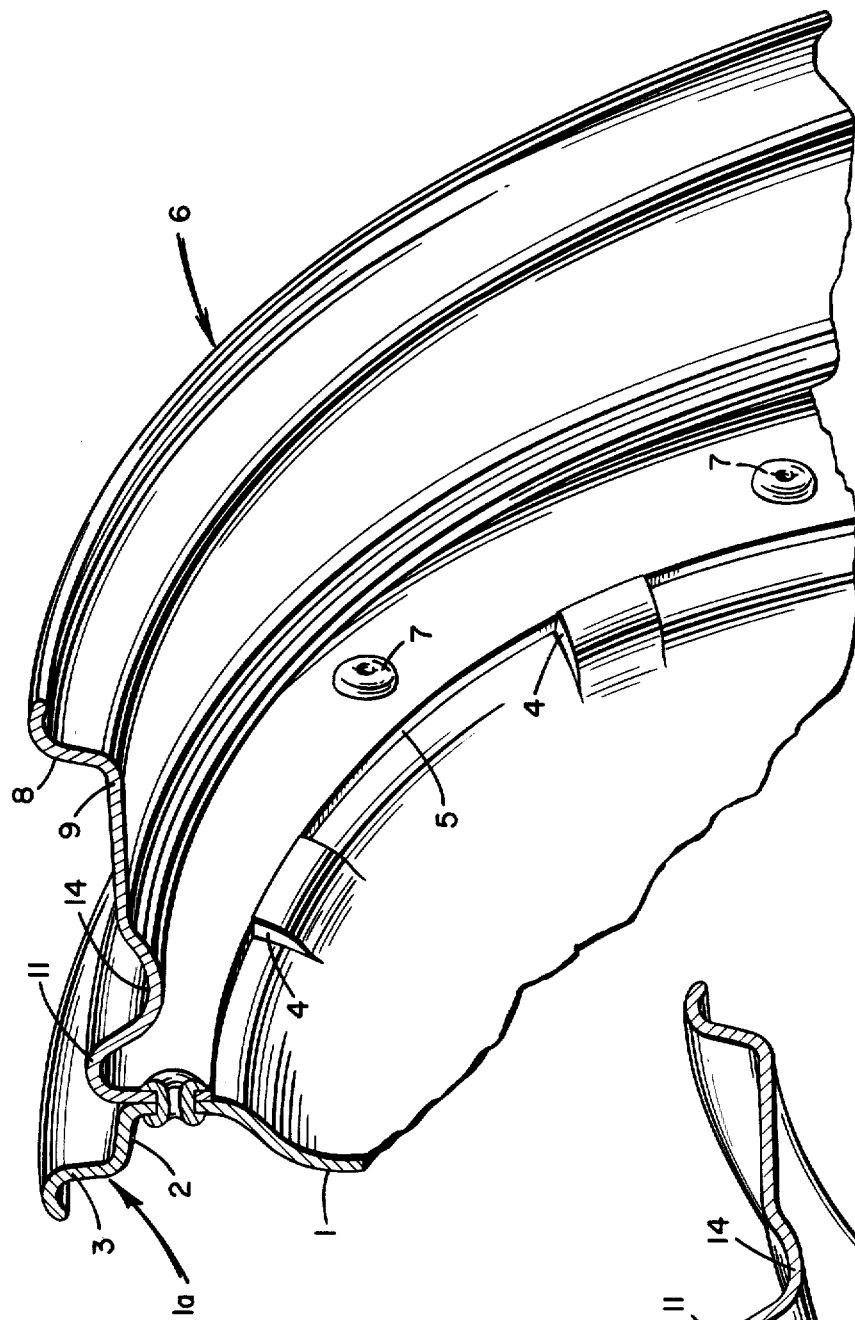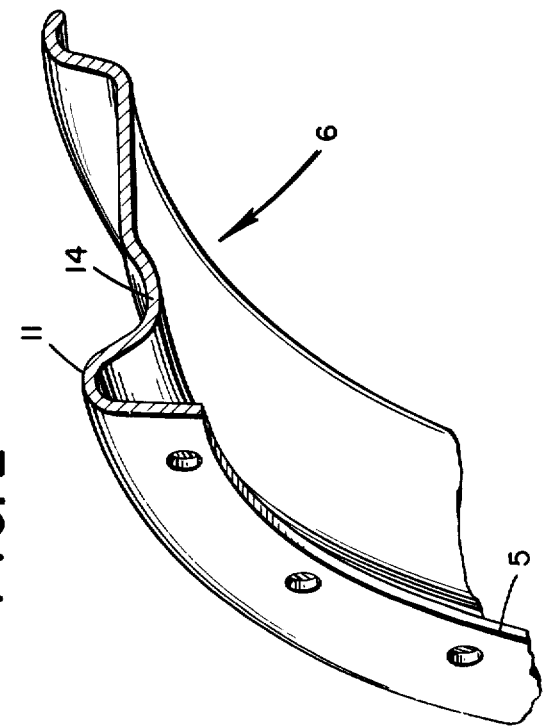

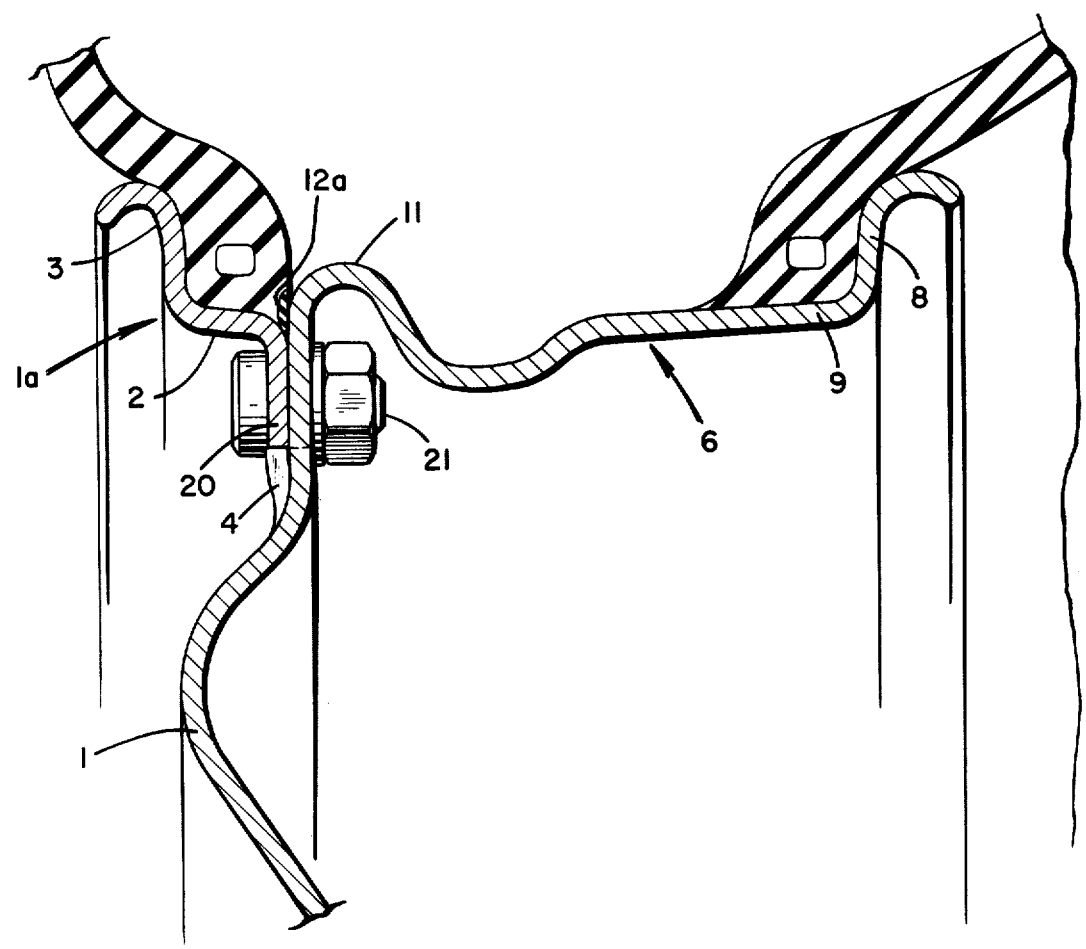

PNEUMATIC TIRE WHEEL RIM ASSEMBLY

This invention relates to wheels, and pneumatic tire and wheel assemblies.

One object of the present invention is to provide a wheel and tire assembly in which a pneumatic tire is mounted on a rim which does not have the deep well which is normally provided to enable the tire to be fitted.

According to the invention, a rim for a pneumatic tire comprises a first rim part having a tire bead retaining flange and bead seating portion secured to a second rim part which comprises the other tire bead retaining flange and is formed in the region adjacent the first rim part with a circumferentially extending radially outwardly projecting hump portion arranged to be capable of making air-tight sealing engagement with the bead of an associated tire seated on the first rim part, the second rim part comprising a shallow well portion of sufficient depth to enable a tire bead to be passed over the hump portion.

By a "hump portion" is meant a portion of the rim which in axial cross-section has a convex profile presented radially outwardly of the rim and has a radially inwardly extending flange portion the radially outer part of which is arranged to be engageable with an associated tire bead to effect the required air-tight seal.

In a wheel and tire assembly incorporating a rim in accordance with the invention, the two rim parts are clamped together, for example by rivetting a radially inwardly turned flange on the second rim part to a wheel disc portion associated with the first rim part, the tire bead being compressed between the hump portion of the second rim part and the retaining flange of the first rim part so as to seal the joint between the rim parts.

The invention will now be described, by way of example with reference to the accompanying drawings in which:

FIG. 2 is a broken away perspective view, partly in section, of the second rim portion of FIG. 1, it being understood that a similar cross section continues around the entire circumference of the rim;

FIG. 3 is a broken away perspective view, partly in section, of the inside of the wheel rim of FIG. 1; and FIG. 4 is a cross sectional view of a second embodiment of a wheel incorporating the rim of the present invention.

In the drawing like numbers are used to identify the same part in all the figures.

Figure 1:
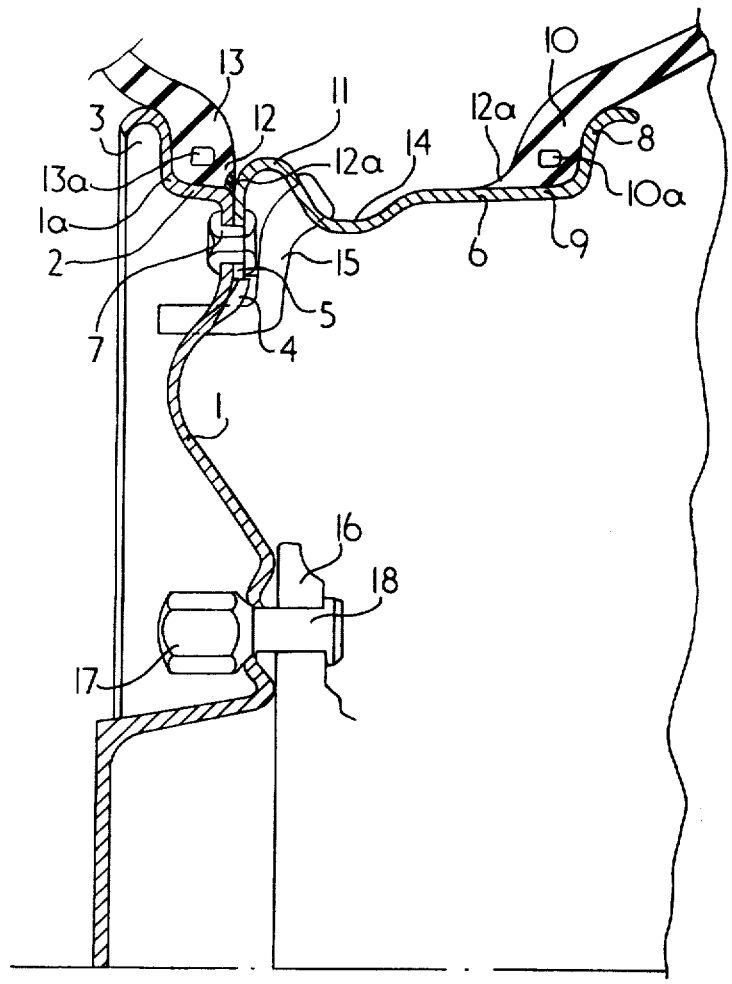
FIG. 1 is a cross sectional view of a first embodiment of a wheel incorporating a rim according to the invention, and a broken away pneumatic tire seated thereon.

The wheel and pneumatic tyre assembly shown in the drawing comprises a pneumatic tire of conventional type mounted on a wheel which is constructed as follows.

The wheel comprises a disc portion 1 of generally conventional profile which is formed at its outer periphery to provide a tire bead seat 2 and retaining flange 3 which constitutes a first rim part 1a integral with the disc 1. The outer portion of the disc adjacent the first rim part extends in a radial plane relative to the axis of the wheel, and is provided with a series of location shoulders 4 spaced apart around a common pitch circle which serve to locate the radially inner edge of an attachment flange 5 extending radially inwardly from a second rim part 6. Conveniently, the location shoulders 4 are pressed from the metal of the wheel disc.

The second rim part 6 which is arranged to be secured to the first rim part 1a by means of hollow rivets 7 passing through the attachment flange 5 of the second rim part 6 and the radially extending outer portion of the disc portion 1 is formed with a retaining flange 8 and bead seating portion 9 for one bead 10 of the pneumatic tyre.

The two rim parts 1a and 6 may alternatively be detachably secured together by means of nuts and bolts 2, see FIG. 4. The second rim part 6 is of a generally cylindrical shape, apart from the provision of a circumferentially extending radially projecting hump portion 11 adjacent the first rim part for engagement by the toe 12 of the associated tire bead 13. The profile of the second rim part 6 is of a smoothly curved generally S-shaped configuration in this region, bending radially inwardly to form a shallow well 14 adjacent the hump portion 11.

An inflation valve attachment 15 of conventional type is secured in the shallow well portion 14 of the second rim part 6.

The wheel disc portion 1 is arranged to be secured to a hub 16 by means of nuts 17 and studs 18 of conventional form.

In a further embodiment, illustrated in FIG. 4 of the drawing, the wheel disc 1 forms an integral part of the second rim portion 6. The first rim portion comprises a bead retaining flange 3, bead seat 2 and attachment flange 20 and is detachably secured to the second rim portion as previously described.

In fitting the pneumatic tire to the rim it is necessary to pass one bead 10 of the tire over the projecting hump portion 11, and since the beads are substantially inextensible, being reinforced in the usual manner with inextensible wire coils 10a, 13a, the mounting of the tire bead 10 is effected in the conventional manner by the use of the shallow circumferentially extending well 14. The two rim parts are then brought together to clamp the other tire bead 13 between the circumferentially extending hump portion 11 on the second rim part 6 and the retaining flange 3 of the first rim part 1a, the assembled rim parts then being semi-permanently secured together by means of hollow rivets 7 or nuts and bolts as in FIG. 4. The clamping action between the hump portion of the second rim part 6 and the toe 12 of the associated tire bead 13 then effects an air-tight seal which prevents leakage of inflation pressure from the joint between the two rim parts. This seal is improved by the provision of a layer of soft rubber on the bead toes of the tires in such a manner that the toes of the beads have axially inwardly extending lip portions 12a. The tire illustrated is specially designed for use with the kind of wheel rim according to the invention, but a satisfactory seal may be obtained with conventional tires.

The wheel and tire assembly in accordance with the invention has the advantage that the shallow well 14 of the second rim part 6 has a substantially reduced radially inward projection compared with that of the usual well which is provided in conventional rims for motor car wheels, since the well 14 only has to have sufficient depth to allow the tire bead to pass over the hump 11 which is of substantially reduced height (in the radial direction) relative to the height of the rim flange of a normal well-base rim. A greater radial clearance is therefore provided for a brake located within the rim in accordance with the invention than in a conventional wellbase rim. The provision of a bead-engaging hump 11 on the second rim part 6 not only functions to seal the joint between the rim parts but also secures the associated tire bead 13, which when fitted on a vehicle becomes the outboard bead, against any axial displacement which may tend to occur when the tire is partially or completely deflated. This feature is particularly important from the safety aspect as it assists in maintaining vehicle stability and steering even after a loss of pressure has occurred.

When it becomes necessary to remove and replace the tire, it is a simple matter to drill out the hollow rivets which secure the two rim parts together and to place a new tire in position on the rim. This operation can of course be made even simpler by substituting nuts and bolts for the rivets.

I claim:

1. A rim for a pneumatic tire comprising a first rim part having a tire bead retaining flange and bead seating portion, a second rim part having the other tire bead retaining flange and a bead seating portion of the same diameter as the first bead seating portion, said second rim part being formed in the region adjacent the first rim part with a circumferentially-extending radially outwardly projecting hump portion, said hump portion including a radially inwardly turned flange constituting an attachment flange by which the second rim part is secured to the first rim part, the hump portion projecting radially outwardly beyond the radial height of the bead seat on the second rim part and being arranged to be capable of making air-tight sealing engagement with the bead of an associated tire seated on the first rim part, the second rim part having a shallow well portion of sufficient depth to enable a tire bead to be passed over the hump portion.

2. A rim according to claim 1 wherein the first rim part is formed integrally with a wheel disc portion.

3. A rim according to claim 2 wherein the disc portion is provided with a series of location shoulders arranged to locate the radially inner edge of the attachment flange of the second rim part.

4. A rim according to claim 1 wherein the second rim part is formed integrally with a wheel disc portion.

5. A rim according to claim 4 wherein the first rim portion is provided with a radially inwardly turned flange by which the first part is secured to the second rim part.

6. A rim according to claim 5 wherein the disc portion is provided with a series of location shoulders arranged to locate the radially inner edge of the attachment flange of the first rim part.

7. A rim according to claim 1 wherein the profile of the second rim part is of a smoothly-curved generally S-shaped configuration in the region comprising the hump portion and the well portion.

8. A rim according to claim 1 wherein apertures are provided in attachment flanges associated respectively with the first and second rim parts and the rim parts are secured together by means of rivets or bolts and nuts associated with the apertures.

9. A rim according to claim 1 wherein an inflation valve attachment is arranged to be secured in the shallow well portion of the second rim part.

10. A rim and pneumatic tire assembly comprising a first rim part having a tire bead retaining flange and bead seating portion with one tire bead seated thereon, a second rim part having the other tire bead retaining flange and tire bead seating portion with the other tire bead seated thereon, said bead seating portions being of the same diameter, said second rim part being formed in the region adjacent the first rim part with a circumferentially-extending radially outwardly projecting hump portion, said hump portion including a radially inwardly turned flange constituting an attachment flange by which the second rim part is secured to the first rim part, the hump portion projecting radially outwardly beyond the radial height of the bead seat on the second rim part and being arranged to be capable of making air-tight sealing engagement with the tire bead seated on the first rim part, the second rim part having a shallow well portion of sufficient depth to enable the tire bead to be passed over the hump portion.

11. A rim and tire assembly according to claim 10 wherein the toe of the tire bead making an air-tight sealing engagement with the radially outwardly projecting hump portion is coated with a layer of soft rubber.

12. A rim and tire assembly according to claim 11 wherein the layer of soft rubber forms an axially inwardly extending lip.

* * * * *